US009296630B2

(12) United States Patent
Domazet et al.

(10) Patent No.: US 9,296,630 B2
(45) Date of Patent: Mar. 29, 2016

(54) SYSTEM FOR REMOVING CHEMICALS FROM A WORKING FLUID, AND METHODS RELATED TO THE SAME

(75) Inventors: Paul Domazet, Valparaiso, IN (US); Dwight Hughes, Lowell, IN (US)

(73) Assignee: ADVANCED GUARD CONSERVATION, Wichita, KS (US)

( * ) Notice: Subject to any disclaimer, the term of this patent is extended or adjusted under 35 U.S.C. 154(b) by 660 days.

(21) Appl. No.: 13/510,919

(22) PCT Filed: Jan. 27, 2012

(86) PCT No.: PCT/US2012/023012
§ 371 (c)(1),
(2), (4) Date: May 18, 2012

(87) PCT Pub. No.: WO2012/103507
PCT Pub. Date: Aug. 2, 2012

(65) Prior Publication Data
US 2012/0279913 A1    Nov. 8, 2012

Related U.S. Application Data

(60) Provisional application No. 61/436,928, filed on Jan. 27, 2011.

(51) Int. Cl.
*C02F 5/02* (2006.01)
*C02F 1/00* (2006.01)
(Continued)

(52) U.S. Cl.
CPC . *C02F 5/02* (2013.01); *B01J 19/00* (2013.01); *B01J 19/0006* (2013.01); *B01J 19/24* (2013.01);
(Continued)

(58) Field of Classification Search
CPC ............ C02F 1/006; C02F 1/008; C02F 1/66; C02F 1/5236; C02F 1/58; C02F 1/62; C02F 2209/03; C02F 2209/06; C02F 2209/40; C02F 2209/005; C02F 2209/055; C02F 2103/023; C02F 5/02; C02F 2101/20; C02F 2303/08; C02F 2303/22; C02F 1/5209; C02F 1/5245; C02F 5/025; B01J 19/000006; B01J 19/006; B01J 19/0086; B01J 19/24; B01J 19/2405; B01J 19/32
See application file for complete search history.

(56) References Cited

U.S. PATENT DOCUMENTS 3,617,544 A   11/1971   Voss
3,989,608 A   11/1976   DeMonbrun
(Continued)

FOREIGN PATENT DOCUMENTS

WO    WO 2008082647 A2 *   7/2008

OTHER PUBLICATIONS

International Search Report for Application No. PCT/US12/23012 Dated Oct. 5, 2012.

*Primary Examiner* — Lucas Stelling
(74) *Attorney, Agent, or Firm* — Nelson Mullins Riley & Scarborough LLP

(57) ABSTRACT

A method for removing an unwanted chemical from a working fluid of a system includes: 1) pumping into a tank a working fluid that includes an unwanted, first chemical; 2) injecting into the tank a second chemical in an amount that provides or substantially provides a stoichiometric ratio relative to the amount of the unwanted, first chemical in the working fluid; 3) mixing the second chemical with the working fluid in a first portion of the tank to generate a molecule that precipitates out of the working fluid and that includes the unwanted, first chemical; 4) holding the working fluid in a second portion of the tank to separate the molecule from the working fluid; and 5) ejecting the working fluid from the second portion. The flow rate of the working fluid and the size of the first and second portions of the separation tank are coordinated to make the working fluid take at least 4 minutes to flow through the tank.

22 Claims, 3 Drawing Sheets

(51) Int. Cl.
  *C02F 1/66* (2006.01)
  *B01J 19/00* (2006.01)
  *B01J 19/24* (2006.01)
  *C02F 103/02* (2006.01)

(52) U.S. Cl.
  CPC . *C02F 1/008* (2013.01); *C02F 1/66* (2013.01); *C02F 2103/023* (2013.01); *C02F 2209/005* (2013.01); *C02F 2209/03* (2013.01); *C02F 2209/06* (2013.01); *C02F 2209/40* (2013.01)

(56) References Cited

U.S. PATENT DOCUMENTS

| | | |
|---|---|---|
| 4,172,786 A | 10/1979 | Humphrey |
| 4,246,102 A | 1/1981 | Hjelmner |
| 4,389,317 A * | 6/1983 | Trentelman et al. .......... 210/715 |
| 5,057,229 A | 10/1991 | Schulenburg |
| 5,114,576 A | 5/1992 | Ditzler |
| 5,342,510 A | 8/1994 | Eden |
| 5,424,032 A | 6/1995 | Christensen |
| 6,077,444 A | 6/2000 | Peltzer |
| 6,416,672 B1 | 7/2002 | Midkiff |
| 6,488,740 B1 | 12/2002 | Patel |
| 6,510,368 B1 | 1/2003 | Beardwood |
| 6,649,065 B2 | 11/2003 | Boyce |
| 6,746,609 B2 | 6/2004 | Stander |
| 7,029,588 B2 | 4/2006 | Owens |
| 7,157,008 B2 | 1/2007 | Owens |
| 7,273,558 B2 | 9/2007 | Miecznik |
| 7,658,855 B2 | 2/2010 | Owens |
| 7,699,991 B2 | 4/2010 | Owens |
| 7,842,778 B2 | 11/2010 | DeBruin |
| 2002/0071793 A1 | 6/2002 | Jensen |
| 2003/0127391 A1 | 7/2003 | Craft |
| 2007/0119787 A1 | 5/2007 | Dart |
| 2008/0115925 A1 | 5/2008 | Tanaka |
| 2008/0312406 A1 | 12/2008 | DeBruin |
| 2010/0025333 A1 | 2/2010 | Owens |
| 2010/0197905 A1 | 8/2010 | Rodrigues |
| 2010/0219082 A1 | 9/2010 | Alcocer |

* cited by examiner

SYSTEM FOR REMOVING CHEMICALS FROM A WORKING FLUID, AND METHODS RELATED TO THE SAME

CROSS REFERENCE TO RELATED APPLICATION AND CLAIM OF PRIORITY

This application claims priority from commonly owned U.S. Provisional Patent Application 61/436,928 filed 27 Jan. 2011, and titled "Equipment & Control Methods for a Zero Liquid Discharge System Applied to Evaporative Cooling Towers", which is incorporated by reference.

BACKGROUND

There are many different types of working fluids—fluids that are used primarily to reduce and/or convey energy such as heat and/or to convey matter such as a chemical, molecule and/or an arrangement of molecules from one place to another in a system. The type of fluid used as a working fluid in a system often depends on the specific requirements of the system. For example, oil in an engine is desired because it can withstand a moderate amount of heat and lubricates many moving parts within the engine to reduce the amount of unwanted heat generated by the engine.

Water is another type of working fluid and is often used in systems to convey heat and/or matter within the system. For example, water is often used to remove from a system excess heat generated in the system. In such uses, the water flows through a heat exchanger of the system where it absorbs heat from the system. The heated water then flows to another heat exchanger—often a cooling tower—to release its heat to the ambient environment. A cooling tower works by directing ambient air through a flow of water droplets. As the air contacts the water droplets, some of the water's heat is removed from the water via convection, and some of the water's heat is removed from the water via evaporation. Consequently, water must be routinely added to the system to replace the water lost from evaporation.

Unfortunately, the water of such systems must also be routinely treated to maintain a desired hardness. Hardness is a measure of the amount of cations—positively charged atoms or molecules—in the water, which are usually caused by dissolved metals. The larger the number of cations or amount of dissolved metals in the water, the harder the water. The two most common metals that contribute to water's hardness are calcium (Ca) and Magnesium (Mg). These metals typically exist as carbonate molecules $CaCO_3$ and $MgCO_3$ that when dissolved in water yield $Ca^{+2}$, $Mg^{+2}$, and $CO_3^{-2}$. Because water that evaporates does not include the metals, and thus the cations, and because water that is added to the system typically does include such metals, the hardness of the water or working fluid of the system increases over time. This increase can lead to excessive hardness in the water which can cause scaling in the system which can foul components of the system like pipes, valves and pressure sensors. Excessive hardness in the water or working fluid can also promote corrosion in the system, causing premature and possibly catastrophic failure.

One method for reducing the hardness of the water in such systems is to simply dump a large portion of the water out of the system and replace the dumped water with water whose hardness levels are less than the levels of the dumped water. Unfortunately, this consumes much water because the amount of water needed to replace the dumped water can be large, and the frequency at which the dump and replacement should occur can be high. Also, the water that is dumped is too contaminated to be readily used for something else. To reduce the amount of water dumped and the frequency at which the dump occurs, many chemically treat the water to keep the minerals in a less destructive form. Unfortunately though, chemically treating the water doesn't allow one to avoid having to periodically dump the water because the water and the chemical program have limits to the amount of minerals and chemicals that they can hold.

Thus, there is a need for a system that more efficiently removes unwanted minerals and other unwanted chemicals from a working fluid such as water in a cooling tower system.

SUMMARY

In an aspect of the invention, a method for removing an unwanted chemical from a working fluid of a system includes: 1) pumping into a tank a working fluid that includes an unwanted, first chemical; 2) injecting into the tank a second chemical in an amount that provides or substantially provides a stoichiometric ratio relative to the amount of the unwanted, first chemical in the working fluid; 3) mixing the second chemical with the working fluid in a first portion of the tank to generate a molecule that precipitates out of the working fluid and that includes the unwanted, first chemical; 4) holding the working fluid in a second portion of the tank to separate the molecule from the working fluid; and 5) ejecting the working fluid from the second portion. The flow rate of the working fluid and the size of the first and second portions of the separation tank are coordinated to make the working fluid take at least 4 minutes to flow through the tank.

By providing the second chemical in an amount that provides or substantially provides a stoichiometric ratio relative to the amount of the unwanted, first chemical in the working fluid, and allowing at least four minutes for the second chemical to react with substantially all of the unwanted, first chemical, the working fluid leaves the separation tank substantially free of the unwanted chemical and at a desired pH. Thus, one does not have to dump or blow-down any of the working fluid to remove unwanted chemicals in the fluid. Furthermore, after the system has removed much of the unwanted chemical that initially existed in the working fluid or that accrued over time in the working fluid, the system may be tuned to remove the unwanted chemical that enters the system working fluid via the addition of working fluid to replace losses from system leaks, wind drift losses, and/or evaporation. In such a steady-state situation, the amount of working fluid that flows through the separation tank may be as low as 0.5% of the total flow of the working fluid through the fluid's system.

In another aspect of the invention, a system to remove an unwanted chemical from a working fluid includes a tank having a first portion operable to receive a working fluid that includes an unwanted, first chemical, and a second chemical operable to react with the unwanted, first chemical to generate a molecule that includes the unwanted, first chemical and that precipitates out of the working fluid. The tank also includes a second portion operable to hold the working fluid while the molecule is separated from the working fluid. The system further includes a first valve operable to control the flow of the working fluid into the tank; a second valve operable to inject the second chemical into the tank; a controller operable to instruct the second valve to inject an amount of the second chemical that provides or substantially provides a stoichiometric ratio relative to the amount of the unwanted, first chemical in the working fluid; a third valve operable to purge the molecule from the tank; and an outlet through which the working fluid is expelled from the tank when working fluid flows through the tank.

DETAILED DESCRIPTION

Figure 1:
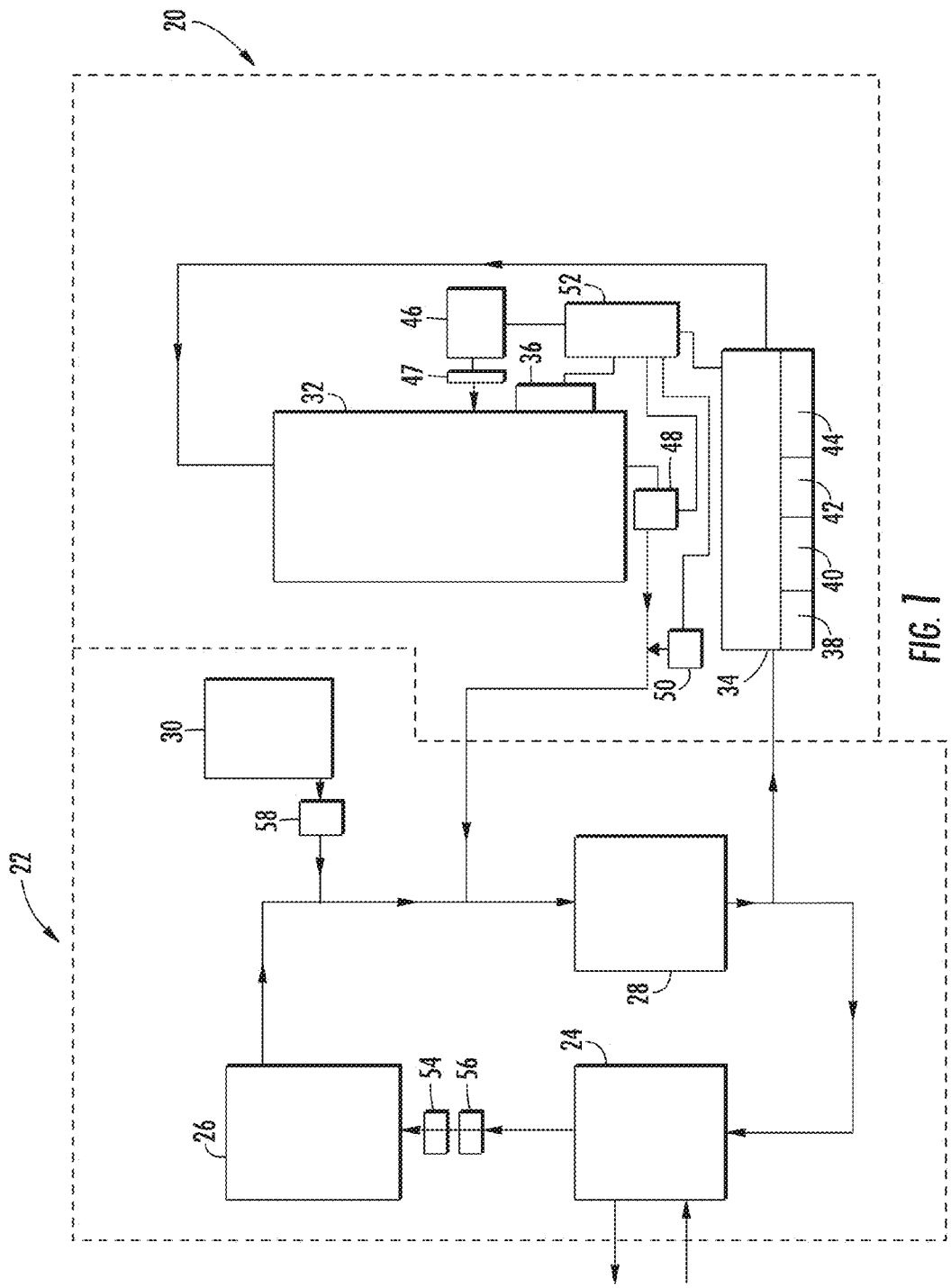
FIG. 1 is a schematic view of a system for removing an unwanted chemical from the working fluid of a cooling tower system, according to an embodiment of the invention.

FIG. 1 shows a schematic view of a system 20 for removing an unwanted chemical (not shown) from a working fluid (not shown) of another system 22, according to an embodiment of the invention. The system 22 may be any system that uses a working fluid to reduce the amount of excess energy, such as heat, that the system 22 generates. The system 22 may also use a working fluid to convey energy, such as heat, and/or matter, such as a chemical, molecule and/or an arrangement of molecules, from one location in the system 22 to another location in the system. Here, the system 22 is a cooling tower system that removes heat from another system such as a power generation system and releases the heat into the atmosphere. In this cooling tower system, water is the working fluid. In operation, the heat generated from the power station is transferred to the water of the cooling tower system 22 via the heat exchanger 24. The water then carries the heat to the cooling tower 26 where the heat is released to the atmosphere via convection and removed from the water via evaporation. The remaining water then flows back to the heat exchanger 24 via a pump 28 to pick up more heat and perform the cycle again. A make-up water source 30 periodically adds water to the system 22 to replace the water that is lost from evaporation, and/or leaks in the system, such as that caused by wind that blows a portion of the water out of the cooling tower and improperly seated seals in the system's piping components.

The system 20 for removing an unwanted chemical from the working fluid of the system 22 includes a separation tank 32 (discussed in greater detail in conjunction with FIGS. 2 and 3) in which the working fluid is received, mixed with a second chemical (not show) that reacts with the unwanted, first chemical to form one or more molecules (also not shown), and held for a period to separate the one or more molecules from the working fluid. The amount of the second chemical injected into the separation tank is the amount that provides or substantially provides a stoichiometric ratio relative to the amount of the unwanted, first chemical in the working fluid. The stoichiometric ratio is the ratio of the amount of the second chemical to the amount of the unwanted, first chemical such that when their reaction is completed the second chemical and the unwanted, first chemical are consumed. The duration of the period that the working fluid is held in the tank 32 may be any desired duration that allows enough time for the one or more molecules to be generated and separated from the working fluid. By providing the second chemical in an amount that provides or substantially provides a stoichiometric ratio relative to the amount of the unwanted, first chemical in the working fluid, and allowing at least four minutes for the second chemical to react with substantially all of the unwanted, first chemical, the working fluid leaves the separation tank substantially free of the unwanted, first chemical.

Figure 2:
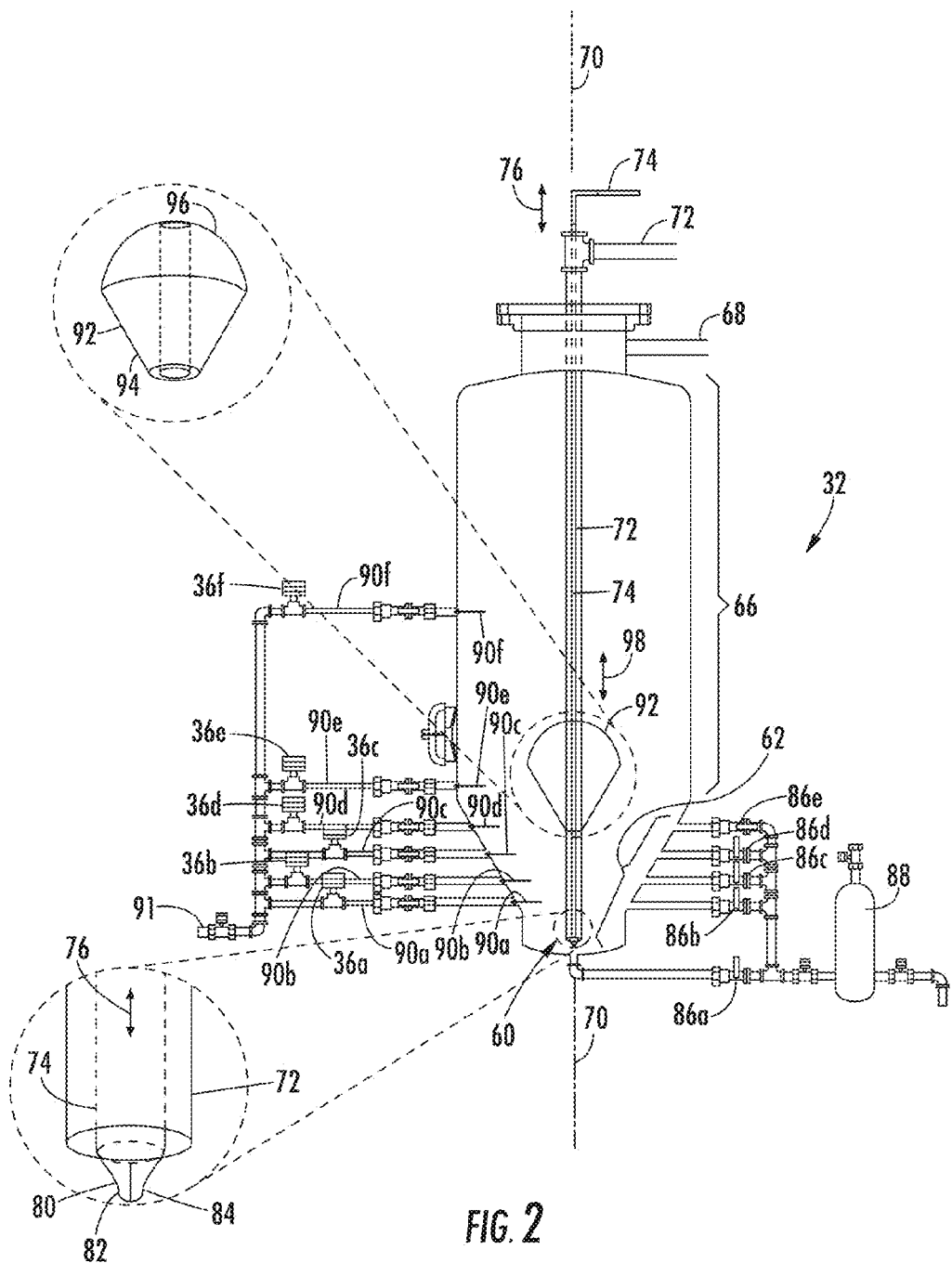
FIG. 2 is a partial cross-sectional view of a separation tank included in the system for removing an unwanted chemical shown in FIG. 1, according to an embodiment of the invention.
Figure 3:
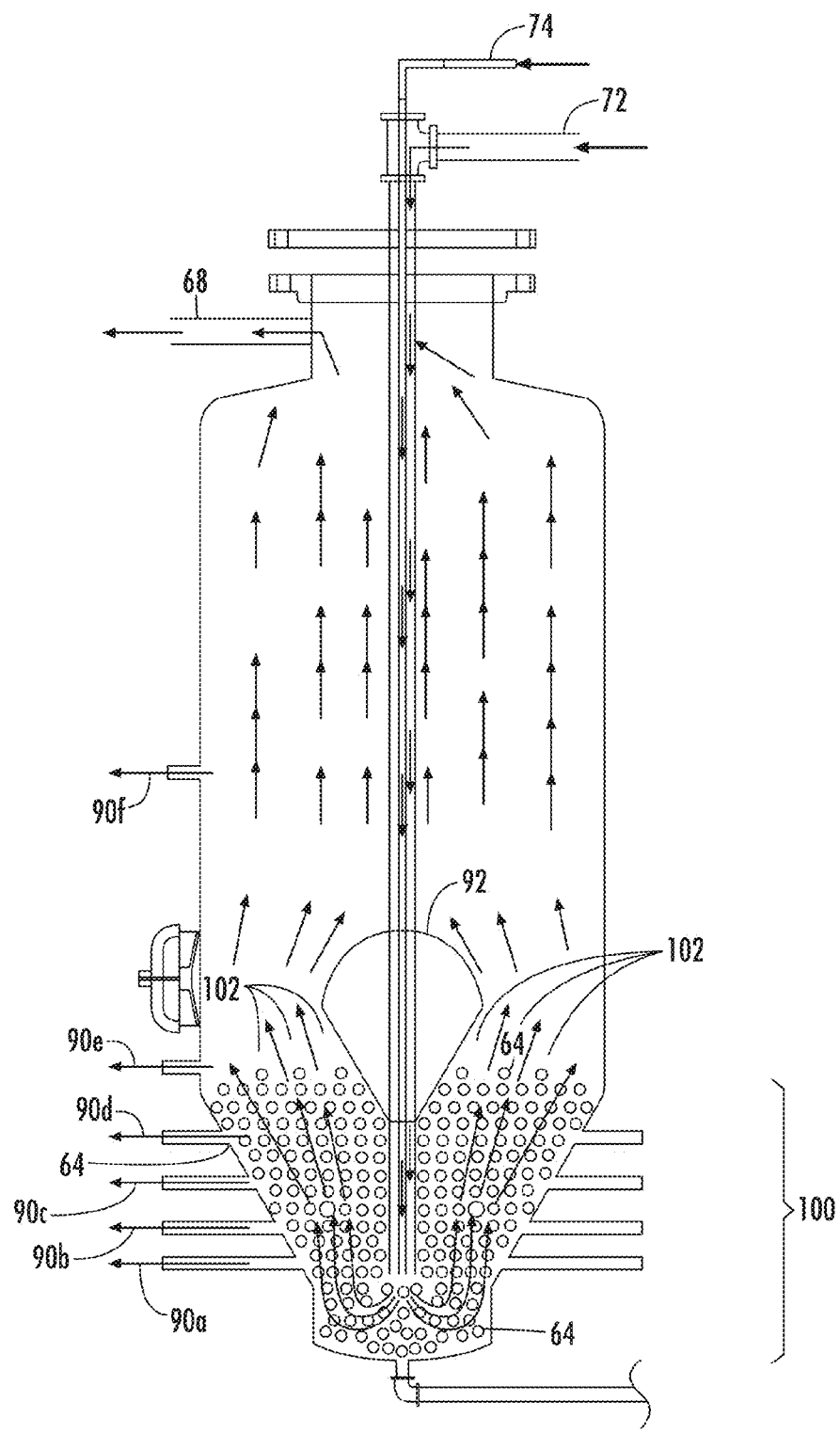
FIG. 3 is a schematic view of the separation tank in FIG. 2 showing the flow of the working fluid through the tank, according to an embodiment of the invention.

Although the system 20 may be used to remove an unwanted chemical from any working fluid, the embodiments of the system 20 shown in FIGS. 2 and 3 and discussed in conjunction with these FIGS. are designed for a system 22 that uses water as its working fluid, such as the cooling tower system 22.

Still referring the FIG. 1, the system 20 includes a sensor 34 to obtain information about the water flowing toward the separation tank 32, and another sensor 36 (discussed in greater detail in conjunction with FIGS. 2 and 3) to obtain information about the water flowing through the tank. For example, in this and other embodiments of the system 20, the sensor 34 includes four sensors 38, 40, 42, and 44. The sensor 38 includes a temperature transducer to sense the temperature of the water flowing toward the separation tank 32. The sensor 40 includes a pH transducer to sense the pH of the water flowing toward the separation tank 32. The sensor 42 includes a conductivity transducer to sense the electrical conductivity of the water flowing toward the separation tank 32. And, the sensor 44 includes an oxidation reduction potential transducer to sense the amount of dissolved oxygen in the water flowing toward the separation tank 32. The sensor 36 includes a pressure transducer to sense the pressure of the water flowing inside the separation tank 32.

Other embodiments are possible. For example, the system 20 may include fewer or more sensors depending on the information needed to decide whether or not to modify the operation of one or more of the system components. This information substantially depends on the type of working fluid being cleaned and the type of unwanted chemical being removed from the fluid.

The system 20 also includes a second chemical source 46 from which the second chemical is injected into the separation tank 32 through a valve 47, a valve 48 to control the amount of water flowing through the system 20, and a chelant source 50 from which a chelants—chelating agent or sequestering agent—may be added to the water before the water returns to the cooling tower system 22. The second chemical is discussed in greater detail in conjunction with FIGS. 2 and 3, and the chelant may be any desired chelant capable of binding with an unwanted, first chemical that exists in the water flowing through the cooling tower system 22 to hinder the unwanted, first chemical's ability to react with other chemicals in the system 22. For example, in this and other embodiments, the valve 48 may be a conventional flow control valve that allows infinite adjustment to the amount of water flowing through the system 20. The chelant may be any natural or man-made carboxylated, or polycarboxylated agent or dispersant capable of stabilizing hardness and other matter in the system, and releasing hardness and suspended matter in the separation tank, when reacting with the second chemical. Additionally, the chelant may include corrosion inhibitors to protect system components from damage.

Other embodiments are possible. For example, the system may include fewer or more components, such as a pump to increase the pressure in the flow, depending on the type of working fluid being cleaned and the type of unwanted chemical being removed from the fluid.

Still referring to FIG. 1, the system 20 may also include a controller 52 to monitor information from a sensor in the system 20, such as the one or more sensors 36-44, and/or a sensor in the cooling tower system 22. The system 22 may include a flow meter 54 that provides the controller 52 information about the amount of water flowing through the system 22, a temperature transducer 56 that provides the controller 52 information about the temperature of the water flowing through the system 22, and a flow meter 58 that provides the controller 52 information about the amount of water being added to the system 22 from the make-up water source 30. The controller 52 may then, in response to the information received, instruct one or more of the other components 46-50 of the system 20 to perform a function.

For example, in this and other embodiments, the controller is a conventional proportional-integral-derivative (PID) programmable logic controller (PLC) that uses Ladder Logic as its programming language to process the information received from one or more of the sensors 36-44 and 54-58. In response to an increase in the amount of water added to the cooling tower system 22, and thus an increase in the amount of cations in the system's water, the controller 52 may determine whether or not the flow rate through the separation tank 32 is less than the maximum flow rate allowed to keep the water in the separation tank 32 for at last four minutes. If the flow rate is below this maximum, then the controller 52 may open the valve 48 to increase the flow through the system 20, and increase the amount of second chemical injected into the separation tank to maintain the stoichiometric ratio. By doing this, the system 20 can continue to efficiently remove unwanted chemicals from the cooling tower system's water. If the flow rate is at the maximum, then the controller 52 may alert a technician of the condition, who can then address the situation.

By monitoring the conditions of the water flow through the cooling tower system 22, and modifying the flow of the water through the system 20, and the amounts of the second chemical and the chelant injected into the water, the controller 52 may tune the system 20 to efficiently remove an unwanted chemical from the water, and continually tune the system 20 in response to changes in the water conditions in the cooling tower system 22 and/or flow conditions in the system 20. This may be beneficial when the system 20 is initially used to remove an unwanted chemical from the water because the system may be initially tuned to quickly remove a large amount of the unwanted chemical from the water, and then re-tuned as the concentration of the unwanted chemical reduces. This may also be beneficial when the system 20 is used to maintain a consistent removal of an unwanted chemical from the water because the system can fine tune itself in response to small changes in the flow conditions in the cooling tower system 22 and/or flow conditions in the system 20. In such a steady-state situation, the amount of working fluid that flows through the separation tank may be as low as 0.5% of the total flow of the working fluid through the fluid's system.

Other embodiments are possible. For example, the controller 52 may include a computer such as a conventional desktop or laptop computer having a Windows, or OSX operating system, and executing a programmable language other than Ladder Logic. Or, the system may not include a controller 52, but instead be manually tuned by a technician.

FIG. 2 is a partial cross-sectional view of the separation tank 32 shown in FIG. 1, according to an embodiment of the invention. The tank 32 includes an inlet 60 through which the water and the second chemical enter the tank 32, a first portion 62 where the water and the second chemical are received and substantially mix to generate the molecule (64 in FIG. 3), a second portion 66 that holds the water while the molecule 64 is separated from it, and an outlet 68 through which clarified water is expelled from the tank 32. The flow rate of the water through the tank 32 and the size of the first and second portions 62 and 66, respectively, are coordinated to make the water take at least four minutes to flow through the tank 32.

The size and shape of the first and second portions 62 and 66, respectively, may be any desired size and shape that together retain the water inside the tank for at least four minutes. For example, in this and other embodiments, the first portion 62 of the tank 32 includes an inverted, truncated cone, the second portion 66 includes a cylinder, and the water takes about ten minutes to flow through the tank 32. The base of the inverted, truncated cone matches an end of the cylinder such that the cone and cylinder together form the tank 32 having a longitudinal axis 70 that is aligned with the cone's longitudinal axis and the cylinder's longitudinal axis. Furthermore, in this and other embodiments, the tank 32 is disposed such that the inverted, truncated cone is below the cylinder relative to the direction of gravity's pull. By orienting the tank 32 in this way, the water and the second chemical enter at the tank's bottom and percolate through the first portion 62 of the tank 32. The water then flows up toward the outlet 68, while gravity pulls any of the molecules 64 that remain suspended in the water to separate the suspended molecules from the water before the water leaves the tank 32 through the outlet 68.

Still referring to FIG. 2, the inlet 60 through which the water and the second chemical enter the tank 32, may be configured as desired to promote mixing of the water and the second chemical. For example, in this and other embodiments, the inlet 60 is located at the bottom of the tank's first portion 62 and is oriented such that the water and the second chemical flow toward the bottom of the tank 32 as they enter the tank. The water flows through the tube 72 whose exit forms the inlet 60, and the second chemical flows through the tube 74 whose exit is concentric and coplanar with the exit of the tube 72. In addition, the tube 74 is moveable relative to the tube 72 along the tank's longitudinal axis 70 in the direction of the arrows 76 to allow the location of the exit of the tube 74 to be adjusted relative to the location of the exit of the tube 72. In this manner, the location of the second chemical's entrance into the tank 32 can be modified relative to the location of the water's entrance into the tank 32 and within the first portion of the tank 32, to promote the mixing of the water and the second chemical.

To keep the exit of the tube 74 from fouling, a check valve 80 covers the exit of the tube 74. The valve 80 may be any desired check valve that seals the exit of tube 74 when the second chemical is not injected into the tank 32. For example, in this and other embodiments, the valve 80 includes two opposing flaps 82 and 84 that are very similar to a duck's bill. The pressure of the water passing through the exit of the tube 72 and the pressure of the water inside the tank 32 urge the two flaps 82 and 84 together. When together in this manner, the two flaps 82 and 84 seal the exit of the tube 74 to prevent water from entering the tube 74. To open the check valve 80 the second chemical inside the tube is urged to flow out of the tube 74 through the tube's exit. When the second chemical reaches the two flaps 82 and 84, the second chemical urges the flaps 82 and 84 to spread apart, and thus allow the second chemical to enter the tank 32.

Still referring to FIG. 2, the second chemical may be any desired caustic or alkaline donor that will react with the unwanted chemical in the water to form a molecule that will precipitate out of the water. For example, in this and other embodiments, the second chemical includes Sodium or Potassium Hydroxide. This reacts well with most scale inhibitors. In other embodiments, the second chemical may include a mixture of caustics or alkaline donors that best suit the water being treated.

To control the flow of the second chemical through the tube 74 and into the tank 32, the system 20 may include any desired valve capable of performing this task. For example, in this and other embodiments, the valve that controls the flow of the second chemical into the tank is the valve 47 (in FIG. 1), which is an electric flow control valve. To control the flow of water through the tube 72 and into the tank 32, the system 20 may include any desired valve capable of performing this task. For example, in this and other embodiments, the valve that controls the flow of the water into the tank is the valve 48 (in FIG. 1), which is also an electric flow control valve.

Still referring to FIG. 2, the system 20 includes a valve 86 to purge from the tank 32 the one or more molecules that precipitate out of and are separated from the water in the tank 32. The valve 86 may be any desired valve that when opened allows the one or more molecules to flow out of the tank 32, and when closed does not allow water to leave the tank 32 through it. For example, in this and other embodiments, the valve 86 includes five valves 86a, 86b, 86c, 86d and 86e, each controlling the flow of one or more molecules from a respective one of five regions within the tank's first portion 62. As discussed in greater detail in conjunction with FIG. 3, each of these valves 86a-86e may be independently opened and closed to control the accumulation of one or more molecules in their corresponding regions within the first portion 62. After the one or more molecules are purged from the tank 32, the molecules are directed to an accumulation tank 88 where the volume of the accumulation tank is recorded each time it is filled and emptied for disposal.

Still referring to FIG. 2, the system 20 also includes a pressure transducer 36 to sense the water pressure in the tank 32. The pressure transducer 36 may be any desired transducer capable of sensing the water pressure. For example, in this and other embodiments, the pressure transducer 36 includes six transducers 36a, 36b, 36c, 36d, 36e, and 36f (discussed in greater detail in conjunction with FIG. 3), each sensing the water pressure at a respective one of six regions within the tank 32. Each of these transducers 36a-36f is coupled to a respective one of six tubes 90a-90f that extend into the water flowing through the tank 32. Each of the tubes 90a-90f are disposed at a unique location along the tank's wall, and each are moveable toward and away from the longitudinal axis 70 to allow the respective pressure transducer to sense the water pressure at any desired location along the radius of the tank 32. To keep the tubes 90a-90f clear and thus allow each of the transducers 36a-36f to accurately sense the water pressure in the tank 32, clean water is periodically urged through each of the pipes 90a-90f from the pipe 91 into the tank 32.

Still referring to FIG. 2, the system 20 also includes a flow diverter 92 to direct the combined flow of the second chemical and the water away from the longitudinal axis 70. By directing the combined flow away from the axis 70 as the flow passes through the first portion 62 of the tank 32 and enters the second portion 66, the combined flow through each of the portions 62 and 66 becomes more uniform and more consistent, and thus less likely to concentrate into a path within each portion that provides the least resistance. The flow diverter 92 may be any desired device capable of directing the flow in this manner and withstanding the corrosive environment inside the tank 32. For example, in this and other embodiments, the flow diverter 92 includes an inverted, truncated cone whose surface 94 is smooth and parallel with the inside surface of the tank's first portion 62. Because the surface 94 is parallel to the inside surface of the first portion 62, the—flow as it proceeds through the first portion 62 curls upward in a constant cross-sectional manner, and thus the flow through the second portion 66 remains substantially uniform and consistent.

The flow diverter 92 also includes a spherical end 96 to help reduce eddys that might occur as the water flows past the diverter 92. Such eddys can cause a portion of the water flow to stagnate and not exit the tank 32. In addition, the flow diverter 92 is moveable along the longitudinal axis 70 in the direction indicated by the arrows 98. This allows one to increase or decrease the cross-sectional area of the flow entering the second portion 66, improving molecule settling as the—water enters and flows through the second portion 66. Moving the flow diverter 92 toward the tank's outlet 68 increases the cross-sectional area of the flow entering the second portion 66, and moving the flow diverter 92 toward the inlet 60 decreases the cross-sectional area of the flow entering the second portion 66.

FIG. 3 is a schematic view of the separation tank 32 in FIG. 2 showing the flow of the water through the tank 32, according to an embodiment of the invention. As the molecules 64 precipitate out of the water in the tank 32, the molecules 64 aggregate in the first portion 62 and form a bed 100 of molecules 64 that hinders the flow of subsequent water through the tank 32. By hindering the flow in this manner, the bed 100 acts like a filter that promotes mixing of the second chemical with the water as they flow through the first portion 62, and traps molecules 64 formed and forming in the water as the water flows through the first portion 62. Between the bed 100 and the water in the second portion 66 of the tank lies an interface 102 between the two. If the interface 102 is too far into the second portion 66 of the tank 32, the bed 100 of molecules 64 may plug the tank 32 and stop the flow of water through the tank 32, or may escape the tank 32 through the outlet 68. If the interface 102 is not far enough into the first portion 62 of the tank 32, the water may flow too quickly through the tank 32 and allow some of the molecules 64 and/or unwanted chemical to escape the tank 32 through the outlet 68.

To control the location of the interface 102 between the bed 100 of molecules 64 and the water flowing through the second portion 66 of the tank 32, the controller 52 (in FIG. 1) monitors the pressure sensed by each of the pressure transducers 36a-36f (in FIG. 2), and in response to the pressures sensed, opens one or more of the valves 86a-86e to purge one or more molecules 64 from one or more locations in the bed 100. Because the water continually flows through the tank 32, and because the flow of water through the bed 100 is hindered, the water pressure of the flow in the bed 100 is greater than the water pressure of the flow in the second portion. Thus, as shown in FIG. 3 the water pressure sensed by the pressure transducers 36e and 36f (FIG. 2) are less than the water pressure sensed by the pressure transducers 36a-36d (FIG. 2). The change in the water pressure between the transducers 36d and 36e indicates that the interface 102 lies between the location of the respective tubes 90d and 90e. Because this location of the interface 102 is desired for this tank 32 and this working fluid (water), the controller 52 keeps each of the valves 86a-86e (FIG. 2) closed. If, however, the controller 52 sees that the pressures sensed by each of the pressure transducers 36a-36f are the same or substantially the same, then the controller 52 determines that the interface 102 is too far into the second portion 66 of the tank 32. Because this location of the interface 102 is not desired for this tank 32 and this working fluid (water), the controller 52 opens the valve 86e and purges one or more of the molecules from this location in the bed 100 until the controller sees that the water pressure sensed by the pressure transducers 36e and 36f are the same and less than the water pressure sensed by the pressure transducers 36a-36d. To purge molecules from the bed quicker, the controller 52 may open one or more of the valves 86a-86d.

Other embodiments are possible. For example, the controller 52 may monitor, over time, the pressure sensed by one or more of the pressure transducers 36a-36f. Then, in response to a change in the pressure sensed over time by one of the pressure transducers, the controller 52 may open one or more of the valves 86a-86e to purge one or more molecules 64 from one or more locations in the bed 100.

The preceding discussion is presented to enable a person skilled in the art to make and use the invention. Various modifications to the embodiments will be readily apparent to those skilled in the art, and the generic principles herein may be applied to other embodiments and applications. Thus, the present invention is not intended to be limited to the embodiments shown, but is to be accorded the widest scope consistent with the principles and features disclosed herein.

What is claimed is:

1. A method for removing an unwanted chemical from a working fluid of a system, the method comprising:
    pumping into a tank a working fluid that includes an unwanted, first chemical;
    injecting into the tank a second chemical in an amount that provides or substantially provides a stoichiometric ratio relative to the amount of the unwanted, first chemical in the working fluid;
    mixing the second chemical with the working fluid in a first portion of the tank to generate a molecule that precipitates out of the working fluid and that includes the unwanted, first chemical;
    holding the working fluid in a second portion of the tank to separate the molecule from the working fluid; and
    ejecting the working fluid from the second portion,
    wherein the tank is structured such that the time it takes the working fluid to flow through the tank is greater than four minutes and less than five minutes,
    wherein the working fluid is water,
    wherein mixing the second chemical with the working fluid in the first portion of the tank includes positioning a flow diverter in the tank to direct the combined flow of the second chemical and the working fluid away from a central axis of the first portion of the tank, and
    wherein the flow diverter comprises a structure extending away from the central axis of the first portion of the tank and having a surface parallel to an inside surface of the first portion of the tank.

2. The method of claim 1 wherein: the working fluid includes water that flows through a cooling tower system that removes excess heat from another system, and the unwanted, first chemical includes a metal.

3. The method of claim 1 wherein the amount of working fluid pumped into the tank is less than 1% of the total flow of the working fluid through the system.

4. The method of claim 1 wherein the second chemical includes a caustic or an alkaline donor, including Sodium or Potassium Hydroxide.

5. The method of claim 1 wherein pumping the working fluid includes continuously pumping the working fluid into the tank.

6. The method of claim 1 wherein injecting the second chemical includes continuously injecting the second chemical into the tank.

7. The method of claim 1 wherein: pumping the working fluid into the tank includes pumping the working fluid through an inlet, and injecting the second chemical into the tank includes injecting the second chemical through the same inlet.

8. The method of claim 1 wherein: pumping the working fluid into the tank includes pumping the working fluid through a first inlet, and injecting the second chemical into the tank includes injecting the second chemical through a second inlet, the second inlet being concentrically aligned with the first inlet and positionable along the alignment.

9. The method of claim 1 wherein mixing the second chemical with the working fluid in the first portion of the tank includes directing the flow of the first chemical and the working fluid through a bed of molecules that have precipitated out of the working fluid from a previous flow into the tank.

10. The method of claim 1 wherein holding the working fluid in the second portion of the tank includes directing the flow of the working fluid away from a central axis of the second portion as the flow enters the second portion.

11. The method of claim 1 wherein holding the working fluid in the second portion of the tank includes directing the flow of the working fluid in a direction opposite the direction of gravity's pull to allow gravity to separate the molecule from the working fluid.

12. The method of claim 1 further comprising modifying the amount of the second chemical injected into the tank in response to a change in the concentration of the unwanted, first chemical in the working fluid.

13. The method of claim 1 further comprising purging the tank of the molecule that includes the unwanted, first chemical.

14. The method of claim 1 further comprising: sensing the working fluid pressure in the tank, and in response to the sensed working fluid pressure, opening a valve to purge the tank of the molecule that includes the unwanted, first chemical.

15. The method of claim 1 further comprising: sensing the working fluid pressure in the tank at different locations within the first portion of the tank, and in response to the sensed working fluid pressure at a specific location, opening a valve that corresponds to the specific location to purge the tank of the molecule that includes the unwanted, first chemical.

16. The method of claim 1 further comprising injecting chelants into the working fluid after expelling the working fluid from the tank, wherein the chelants are operable to bind with an unwanted, first chemical as the working fluid flows through the system.

17. The method of claim 1, wherein a location at which the second chemical is introduced into the tank is adjustable.

18. The method of claim 1, wherein mixing the second chemical with the working fluid generates a plurality of molecules that precipitate out of the working fluid, the plurality of molecules aggregating in the first portion to form a bed of molecules, the bed of molecules meeting working fluid in the second portion at an interface, and wherein a location of the interface in the tank is controllable based on differential pressure measured across the interface.

19. The method of claim 1, wherein the flow diverter comprises an inverted, truncated cone a bottom surface of which comprises the surface parallel to the inside surface of the first portion of the tank.

20. A method for removing an unwanted chemical from water, the method comprising:
    pumping the water into a tank, the water including an unwanted, first chemical;
    injecting into the tank a second chemical in an amount that provides or substantially provides a stoichiometric ratio relative to the amount of the unwanted, first chemical in the water;
    mixing the second chemical with the water in a first portion of the tank to generate a molecule that precipitates out of the water and that includes the unwanted, first chemical;

holding the water in a second portion of the tank to separate the molecule from the working fluid; and ejecting the water from the second portion, wherein a location at which the second chemical is introduced into the tank is adjustable;

wherein mixing the second chemical with the water in the first portion of the tank includes positioning a flow diverter in the tank to direct the combined flow of the second chemical and the water away from a central axis of the first portion of the tank, and wherein the flow diverter comprises a structure extending away from the central axis of the first portion of the tank and having a surface parallel to an inside surface of the first portion of the tank.

21. The method of claim 20, wherein the flow diverter comprises an inverted, truncated cone a bottom surface of which comprises the surface parallel to the inside surface of the first portion of the tank.

22. A method for removing unwanted chemical from water, the method comprising:

pumping the water into a tank, the water including an unwanted, first chemical;

injecting into the tank a second chemical in an amount that provides or substantially provides a stoichiometric ratio relative to the amount of the unwanted, first chemical in the water;

mixing the second chemical with the water in a first portion of the tank to generate a molecule that precipitates out of the water and that includes the unwanted, first chemical;

holding the water in a second portion of the tank to separate the molecule from the water; and ejecting the water from the second portion;

wherein mixing the second chemical with the water generates a plurality of molecules that precipitate out of the water, the plurality of molecules aggregating in the first portion to form a bed of molecules, an interface in the second portion between the bed and the water in the second portion, and wherein a location of the interface in the tank is controllable based on differential pressure measured across the interface;

wherein mixing the second chemical with the water in the first portion of the tank includes positioning a flow diverter in the tank to direct the combined flow of the second chemical and the water away a central axis of the first portion of the tank, and wherein the flow diverter comprises a structure extending away from the central axis of the first portion of the tank and having a surface parallel to an inside surface of the first portion of the tank.

\* \* \* \* \*